(12) United States Patent
Paulino et al.

(10) Patent No.: US 10,352,184 B2
(45) Date of Patent: Jul. 16, 2019

(54) AIR METERING FOR BLADE OUTER AIR SEALS

(71) Applicant: UNITED TECHNOLOGIES CORPORATION, Farmington, CT (US)

(72) Inventors: Jose R. Paulino, Saco, ME (US); Ken F. Blaney, Middleton, NH (US); Terence P. Tyler, Jr., East Waterboro, ME (US); Daniel S. Rogers, Arundale, ME (US); Anthony B. Swift, North Waterboro, ME (US); Thomas E. Clark, Sanford, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 306 days.

(21) Appl. No.: 15/339,581

(22) Filed: Oct. 31, 2016

(65) Prior Publication Data

US 2018/0119560 A1    May 3, 2018

(51) Int. Cl.
    *F01D 11/10*    (2006.01)
    *F01D 9/02*     (2006.01)
    (Continued)

(52) U.S. Cl.
    CPC .............. *F01D 11/10* (2013.01); *F01D 9/02* (2013.01); *F01D 11/003* (2013.01); *F01D 11/14* (2013.01);
    (Continued)

(58) Field of Classification Search
    CPC ........ F01D 11/10; F01D 11/08; F01D 11/025; F01D 11/001; F01D 11/00; F01D 11/005; F01D 11/06
    (Continued)

(56) References Cited

U.S. PATENT DOCUMENTS 6,139,257 A * 10/2000 Proctor ..................... F01D 9/04
                                                              415/115
8,814,507 B1   8/2014 Campbell
(Continued)

FOREIGN PATENT DOCUMENTS

| EP | 1927725 | 6/2008 |
| EP | 1930549 | 6/2008 |
| GB | 2244523 | 12/1991 |

OTHER PUBLICATIONS

European Patent Office, European Search Report dated Mar. 14, 1018 in Application No. 17194824.3-1006.

*Primary Examiner* — Carlos A Rivera
*Assistant Examiner* — Jason Mikus
(74) *Attorney, Agent, or Firm* — Snell & Wilmer L.L.P.

(57) ABSTRACT

A seal assembly includes a blade outer air seal, a downstream vane, and a pressure wall, according to various embodiments. The blade outer air seal may include a radially outer surface and the downstream vane may be coupled to the blade outer air seal via a fluid sealing engagement. The pressure wall may be coupled to the blade outer air seal and may define a metering orifice. In various embodiments, the metering orifice of the pressure wall is configured to meter air flow from a first plenum upstream of the pressure wall to a second plenum downstream of the pressure wall. In various embodiments, at least a preponderance of the radially outer surface of the blade outer air seal at least partially defines the first plenum and the fluid sealing engagement at least partially defines the second plenum.

20 Claims, 2 Drawing Sheets

(51) Int. Cl.
    *F01D 25/24*     (2006.01)
    *F01D 11/00*     (2006.01)
    *F01D 11/14*     (2006.01)
    *F01D 25/14*     (2006.01)

(52) U.S. Cl.
    CPC ............ *F01D 25/14* (2013.01); *F01D 25/24* (2013.01); *F01D 25/246* (2013.01); *F05D 2220/32* (2013.01); *F05D 2240/11* (2013.01); *F05D 2240/55* (2013.01); *Y02T 50/672* (2013.01); *Y02T 50/675* (2013.01)

(58) Field of Classification Search
    USPC ........................................................ 415/111
    See application file for complete search history.

(56) References Cited

U.S. PATENT DOCUMENTS

| | | | |
|---|---|---|---|
| 9,103,225 B2 * | 8/2015 | Lutjen | ..................... F01D 11/08 |
| 2013/0266416 A1 | 10/2013 | Bergman | |

\* cited by examiner

AIR METERING FOR BLADE OUTER AIR SEALS

FIELD

The present disclosure relates to gas turbine engines, and more specifically, to blade outer air seals in gas turbine engines.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines. Accordingly, various sections of a gas turbine engine include one or more blade/airfoil arrays (e.g., rotors).

A blade outer air seal (BOAS), which is disposed radially outward from a blade/airfoil array, is generally configured to have a desired fluid pressure on a radially outward surface of the BOAS in order to maintain a desired cooling effect on the BOAS and, to a lesser extent, to maintain a desired radial clearance between tips of the rotating blades and a radially inward surface of the BOAS. If a desired fluid pressure on the radially outward surface of the BOAS is not maintained because of, for example, a seal failure between the BOAS and an adjacent vane or vane support, the BOAS may not be sufficiently cooled and thus may result in the BOAS and/or adjacent vanes having a reduced useful life.

SUMMARY

In various embodiments, the present disclosure provides a seal assembly. The seal assembly includes a blade outer air seal, a downstream vane, and a pressure wall, according to various embodiments. The blade outer air seal may include a radially outer surface and the downstream vane may be coupled to the blade outer air seal via a fluid sealing engagement. The pressure wall may be coupled to the blade outer air seal and may define a metering orifice. In various embodiments, the metering orifice of the pressure wall is configured to meter air flow from a first plenum upstream of the pressure wall to a second plenum downstream of the pressure wall. In various embodiments, at least a preponderance of the radially outer surface of the blade outer air seal at least partially defines the first plenum and the fluid sealing engagement at least partially defines the second plenum.

According to various embodiments, the pressure wall is a blade outer air seal support. In various embodiments, the first plenum is configured to maintain a desired air pressure in the event of a leak in the fluid sealing engagement between the blade outer air seal and the downstream vane. In various embodiments, fluid communication between the first plenum and the second plenum is restricted to the metering orifice of the pressure wall. The fluid sealing engagement may be a first fluid sealing engagement and the pressure wall may be coupled to the blade outer air seal via a second fluid sealing engagement. In various embodiments, the pressure wall may be coupled to at least one of an engine case and an upstream vane via a third fluid sealing engagement.

Also disclosed herein, according to various embodiments, is a gas turbine engine. The gas turbine engine includes an engine case, a blade outer air seal, a first vane, a second vane, and a blade outer air seal support, according to various embodiments. The blade outer air seal may have a radially outer surface, the first vane may be coupled to and forward of the blade outer air seal, and the second vane may be coupled to and aft of the blade outer air seal via a fluid sealing engagement. In various embodiments, the blade outer air seal support is coupled to and radially outward of the blade outer air seal. Also, the blade outer air seal support may define a metering orifice and may have a first side and a second side. In various embodiments, the metering orifice of the blade outer air seal support is configured to meter air flow from a first plenum to a second plenum. In various embodiments, the first plenum is defined by a preponderant portion of the radially outer surface of the blade outer air seal, the first side of the blade outer air seal support, and at least one of the engine case and the first vane. In various embodiments, the second plenum is defined by the fluid sealing engagement, the second side of the blade outer air seal support, and at least one of the engine case and the second vane.

The first plenum may be configured to maintain a desired air pressure in the event of fluid a leak in the fluid sealing engagement between the blade outer air seal and the second vane. In various embodiments, fluid communication between the first plenum and the second plenum is restricted to only the metering orifice of the blade outer air seal support. The fluid sealing engagement may be a first fluid sealing engagement and the blade outer air seal support may be coupled to the blade outer air seal via a second fluid sealing engagement. In various embodiments, the blade outer air seal support is coupled to the engine case via a third fluid sealing engagement.

The blade outer air seal may be disposed in a turbine section of the gas turbine engine and may circumscribe turbine rotors. Also, the first vane may at least partially define a third plenum upstream of the first plenum. The metering orifices may be a first metering orifice and the first vane may define a second metering orifice such that fluid communication between the third plenum and the first plenum is restricted to the second metering orifice.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

Figure 1:
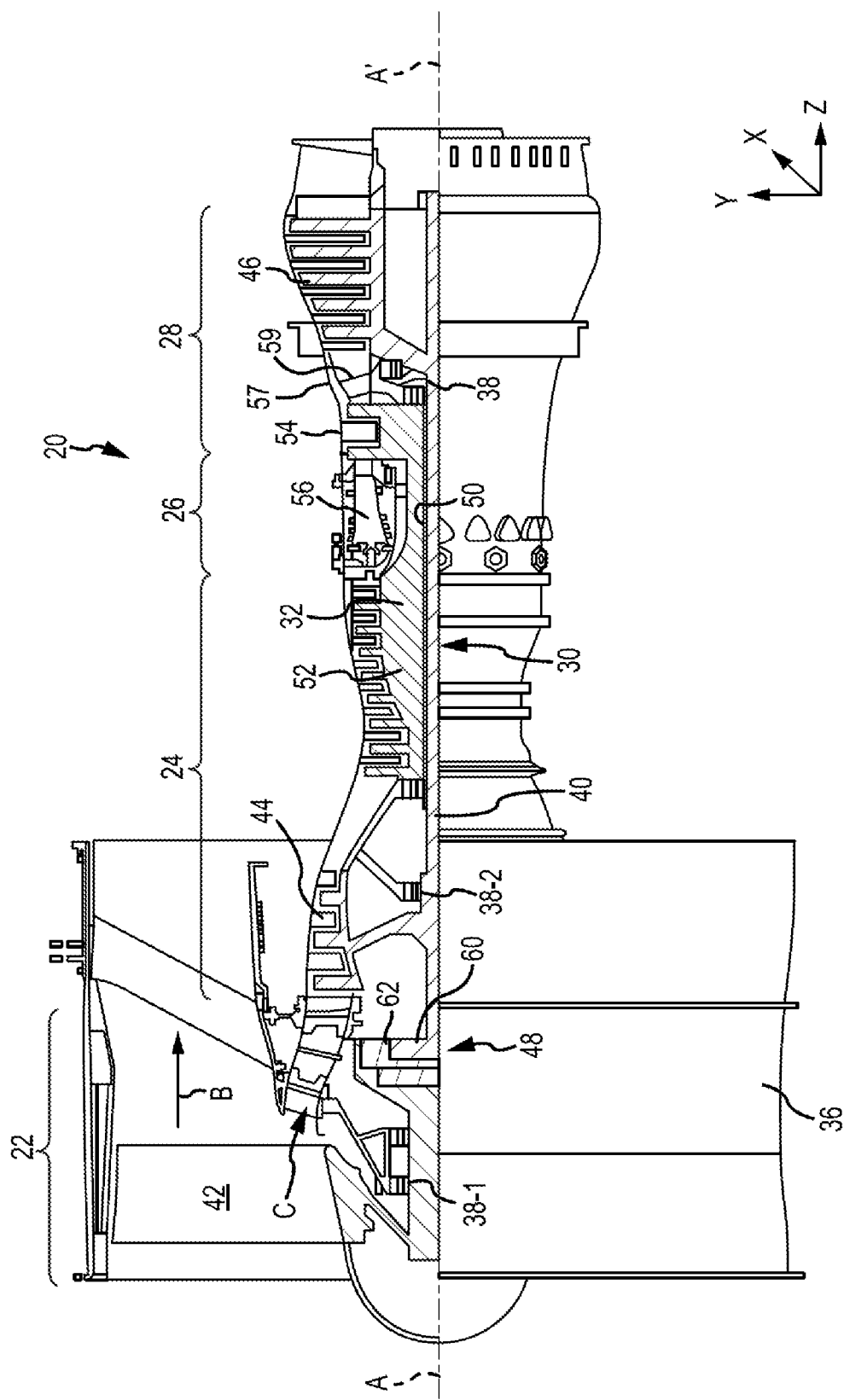
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (i.e., a sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
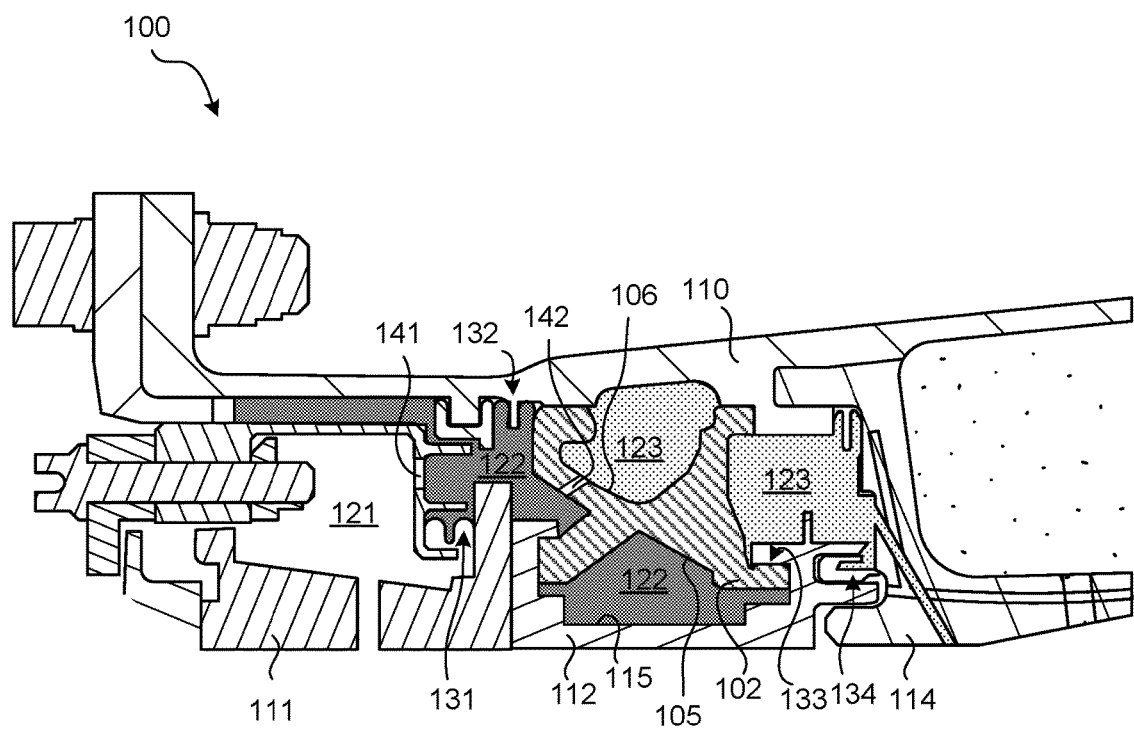
FIG. 2 illustrates a cross-sectional view of a blade outer air seal and adjacent vanes, in accordance with various embodiments.

Disclosed herein, according to various embodiments and with reference to FIG. 2, is a seal assembly 100 that includes a blade outer air seal ("BOAS") 112, a downstream vane 114, and a pressure wall 102. The BOAS 112, according to various embodiments, has a radially outer surface 115 and the downstream vane 114 is coupled to the BOAS 112 via a fluid sealing engagement 134. The pressure wall 102 is coupled to the BOAS 112 and the pressure wall 102 defines a metering orifice 142. Generally, and as is described in greater detail below, the seal assembly 100 is configured to maintain a desired pressure on the radially outer surface 115 of the BOAS 112, even when the fluid sealing engagement 134 between the downstream vane 114 and the BOAS 112 is compromised. That is, even if there is a leak between the downstream vane 114 and the BOAS 112 that causes supply air to leak into a flowpath of the gas turbine engine 20, the pressure wall 102 ensures that a desired pressure is maintained on the radially outer surface 115 of the BOAS 112, thereby maintaining a sufficient cooling effect to the BOAS 112.

The various components of the seal assembly 100, such as the BOAS 112, the vane 114, and the pressure wall 102, are generally annular structures that extend circumferentially around a flowpath of a gas turbine engine. In various embodiments, the components of the seal assembly 100, such as the BOAS 112, the vane 114, and/or the pressure wall 102 may be comprised of arcuate segments that cumulatively form the annular structure. For example, the BOAS 112, the vane 114, and/or the pressure wall 102 may not be a unitary structure but instead may be formed of multiple sections/segments.

In various embodiments, the metering orifice 142 is configured to meter air flow from a first plenum 122 disposed substantially upstream of the pressure wall 102 into a second plenum 123 downstream of the pressure wall 102. While FIG. 2 appears to show the first plenum 122 as having two sections that are separated from each other by a portion of the pressure wall 102, these sections are not actually fluidly separated from each other. In other words, the pressure wall 102 is not configured to create sub-sections or sub-chambers in the first plenum 122, and thus the two sections of the first plenum 122 that appear to be separate in FIG. 2 are in fact fluidly connected via a non-restrictive opening/channel (not visible in FIG. 2). The same is true for the second plenum 123 and the apparent sections that appear to be separated from each other by a portion of the pressure wall 102. That is, the two sections of the second plenum 123 that appear to be fluidly separated from each other are in fact in open, non-restrictive fluid communication with each other, according to various embodiments.

In various embodiments, fluid communication between the first plenum 122 and the second plenum 123 is restricted and/or limited to the metering orifice 142. In various embodiments, the seal assembly 100 may include multiple metering orifices 142. For example, the seal assembly 100 may be an annular structure and thus multiple metering orifices 142 may be circumferentially distributed around the seal assembly 100 to provide desired fluid flow of supply air from the first plenum 122 to the second plenum 123. In various embodiments, the metering orifice 142 (or plurality of metering orifices) is sized to limit the flow rate of supply air transferred from the first plenum 122 to the second plenum 123.

In various embodiments, the pressure wall 102 may be coupled, via fluid sealing engagements 132, 133 to respective components of the seal assembly 100 to essentially divide the volume that is radially outward of BOAS into the two plenums 122, 123. In various embodiments, at least a preponderance of the radially outer surface 115 of the BOAS 112 at least partially defines the first plenum 122. That is, the first plenum 122 is at least partially defined by a majority portion of the radially outer surface 115 of the BOAS 112 and thus the fluid (e.g., supply air) configured to flow in the first plenum 122 is configured to be in direct fluid contact with the radially outer surface 115 of the BOAS 112. Said differently, the entire radially outer surface 115 need not necessarily contribute to the shape/geometry of the first plenum 122, but at least more than half of the area that constitutes the radially outer surface 115 of the BOAS 112 directly borders and thus partially defines the first plenum 122.

In various embodiments, the fluid sealing engagement 134 between the BOAS 112 and the downstream vane 114 at least partially defines the second plenum 123. That is, the fluid sealing engagement 134 helps to maintain supply air in the second plenum 123. As described above, and according to various embodiments, the seal assembly 100 is configured to maintain a desired pressure in the first plenum 122 even if a leak develops in the fluid sealing engagement 134 between the BOAS 112 and the downstream vane 114.

In various embodiments, the second plenum 123 may be configured to deliver supply air to other components, such as the vanes of the downstream vane 114. Thus, while a leak in the fluid sealing engagement 134 between the BOAS 112 and the downstream vane 114 may have adverse cooling effects on the vane 114 and/or the downstream vanes, cooling is still maintained to the BOAS 112 via the first plenum 122. Said differently, because the chamber that is radially outward of the BOAS 112 is divided into two partitions, i.e., the first plenum 122 and the second plenum 123, a leak between the BOAS 112 and the downstream vane 114 does not cause a pressure drop across the entire BOAS 112 but instead is limited to the second plenum 123.

In various embodiments, the pressure wall 102 may be a wall or other feature disposed between the BOAS 112 and a housing, such as the engine case 110 of the gas turbine engine 20. Accordingly, in various embodiments the pressure wall is a blade outer air seal support ("BOAS support") 102. That is, the BOAS support 102 may have a first side 105 and a second side 106, and the metering orifice 142 defined in the BOAS support 102 may extend through the BOAS support 102 from the first side 105 to the second side 106. Accordingly, the first plenum 122 may be partially defined by the radially outer surface 115 of the BOAS 112 and the first side 105 of the BOAS support 102 while the second plenum 123 is at least partially defined by the fluid sealing engagement 134, between the BOAS 112 and the downstream vane 114, and the second side 106 of the BOAS support 102.

In various embodiments, as mentioned above, the BOAS support 102 may be coupled via one or more fluid sealing engagements 132, 133 with respective components of the seal assembly 100. For example, the BOAS support 102 may fluidly isolate (with the exception of the metering orifice 142) the first plenum 122 from the second plenum 123 by being sealingly engaged with the BOAS 112 via fluid sealing engagement 133 and sealingly engaged with an upstream vane 111 and/or the engine case 110 via fluid sealing engagements 131 and/or 132. The fluid sealing engagements 131, 132, 133 may include any of various sealing features, such as "W-seals," feather seals, etc. Throughout the present disclosure, the upstream vane 111 may be referred to as a first vane and/or a forward vane while the downstream vane 114 may be referred to as a second vane and/or an aft vane.

In various embodiments, the upstream vane 111 may at least partially define a third plenum 121 that is disposed upstream of the first plenum 122. That is, the third plenum 121 may be configured to feed supply air into the first plenum 122. In various embodiments, the upstream vane 111 may define, or may be coupled to a component that defines, a second metering orifice 141. For example, a the second metering orifice 141 may be defined in a vane support that is coupled to the vane 111, according to various embodiments. The second metering orifice 141 may be configured to control flow of supply air into the first plenum 122. In various embodiments, this series of plenums 121, 122, 123 fluidly connected via respective metering orifices 141, 142 tends to maintain air pressure, and thus cooling effectiveness, in the event that a leak forms in one or more of the above described fluid sealing engagements 131, 132, 133, 134.

In various embodiments, the seal assembly 100 may be implemented in various sections of the gas turbine engine 20. For example, each of the first and second compressors 44 and 52 and first and second turbines 46 and 54 in the gas turbine engine 20 may include interspersed stages of rotor blades and stator vanes. The rotor blades may rotate about the engine central longitudinal axis A-A' with the associated shaft while the stator vanes remain stationary about the engine central longitudinal axis A-A'. The first and second compressors 44, 52 in the gas turbine engine 20 may each include one or more compressor stages and the first and second turbines 46, 54 in the gas turbine engine 20 may each comprise one or more turbine stages. Each compressor stage and/or turbine stage may comprise multiple sets of rotating blades ("rotor blades") and stationary vanes ("stator vanes"). Accordingly, while the seal assembly 100 may be implemented in conjunction with turbine vanes and turbine blades, the seal assembly 100 may also be implemented in conjunction with compressor vanes and compressor blades.

The components of the seal assembly 100, such as the vanes 111, 114, the BOAS 112, and the BOAS support may be made from a nickel based alloy and/or a cobalt based alloy, among others. For example, the components of the seal assembly 100 may be made from a high performance nickel-based super alloy or a cobalt-nickel-chromium-tungsten alloy. In various embodiments, the components of the seal assembly 100 may be made from other metals or metal alloys, such as stainless steel, etc. In various embodiments, the components of the seal assembly may be made of ceramic materials and/or ceramic matrix composites, among other materials. In various embodiments, the components of the seal assembly 100 may be resistant to corrosion and/or may include one or more surface coatings.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal assembly comprising:
   a blade outer air seal comprising a radially outer surface;
   a downstream vane coupled to the blade outer air seal via a fluid sealing engagement;
   a pressure wall coupled to the blade outer air seal and defining at least one metering orifice, wherein:
   the pressure wall is disposed in a volume that is radially outward of the blade outer air seal;
   the pressure wall divides the volume into a first plenum and a second plenum;

the at least one metering orifice of the pressure wall is configured to meter air flow from the first plenum upstream of the pressure wall to the second plenum downstream of the pressure wall;

fluid communication between the first plenum and the second plenum is restricted to the at least one metering orifice of the pressure wall;

at least a preponderance of the radially outer surface of the blade outer air seal at least partially defines the first plenum; and the fluid sealing engagement at least partially defines the second plenum.

2. The seal assembly of claim 1, wherein the pressure wall is a blade outer air seal support.

3. The seal assembly of claim 1, wherein the first plenum is configured to maintain a desired air pressure in the event of a leak in the fluid sealing engagement between the blade outer air seal and the downstream vane.

4. The seal assembly of claim 1, wherein the first plenum is defined between the radially outer surface of the blade outer air seal and a radially inner surface of the pressure wall.

5. The seal assembly of claim 4, wherein the fluid sealing engagement is a first fluid sealing engagement, wherein the pressure wall is coupled to the blade outer air seal via a second fluid sealing engagement.

6. The seal assembly of claim 5, wherein the pressure wall is coupled to at least one of an engine case and an upstream vane via a third fluid sealing engagement.

7. The seal assembly of claim 1, wherein the second plenum is defined by the fluid sealing engagement, a radially outer surface of the pressure wall, and at least one of an engine case and an upstream vane.

8. The seal assembly of claim 7, wherein the blade outer air seal comprises a plurality of arcuate segments.

9. The seal assembly of claim 1, wherein the at least one metering orifice is a first metering orifice of a plurality of metering orifices, wherein fluid communication between the first plenum and the second plenum is restricted to the plurality of metering orifices.

10. A gas turbine engine comprising:
an engine case;
a blade outer air seal comprising a radially outer surface;
a first vane coupled to and forward of the blade outer air seal;
a second vane coupled to and aft of the blade outer air seal via a fluid sealing engagement; and
a blade outer air seal support coupled to and radially outward of the blade outer air seal, the blade outer air seal support defining at least one metering orifice and comprising a first side and a second side;
wherein:
the blade outer air seal support is disposed in a volume that is radially outward of the blade outer air seal;
the blade outer air seal support divides the volume into a first plenum and a second plenum;
the at least one metering orifice of the blade outer air seal support is configured to meter air flow from the first plenum to the second plenum;
fluid communication between the first plenum and the second plenum is restricted to the at least one metering orifice of the blade outer air seal support;
the first plenum is defined by a preponderant portion of the radially outer surface of the blade outer air seal, the first side of the blade outer air seal support, and at least one of the engine case and the first vane; and
the second plenum is defined by the fluid sealing engagement, the second side of the blade outer air seal support, and at least one of the engine case and the second vane.

11. The gas turbine engine of claim 10, wherein the first plenum is configured to maintain a desired air pressure in the event of a leak in the fluid sealing engagement between the blade outer air seal and the second vane.

12. The gas turbine engine of claim 10, wherein the at least one metering orifice is a first metering orifice of a plurality of metering orifices, wherein fluid communication between the first plenum and the second plenum is restricted to the plurality of metering orifices.

13. The gas turbine engine of claim 10, wherein the fluid sealing engagement is a first fluid sealing engagement, wherein the blade outer air seal support is coupled to the blade outer air seal via a second fluid sealing engagement.

14. The gas turbine engine of claim 13, wherein the blade outer air seal support is coupled to the engine case via a third fluid sealing engagement.

15. The gas turbine engine of claim 10, wherein the blade outer air seal is disposed in a turbine section of the gas turbine engine and circumscribes turbine rotors.

16. The gas turbine engine of claim 10, wherein the first vane at least partially defines a third plenum upstream of the first plenum.

17. The gas turbine engine of claim 16, wherein the at least one metering orifice is at least one first metering orifice and the first vane defines at least one second metering orifice, wherein fluid communication between the third plenum and the first plenum is restricted to the at least one second metering orifice.

18. The gas turbine engine of claim 10, wherein the blade outer air seal comprises a plurality of arcuate segments.

19. The gas turbine engine of claim 10, wherein the blade outer air seal support comprises a plurality of arcuate segments.

20. A gas turbine engine comprising:
an engine case;
a blade outer air seal comprising a radially outer surface;
a first vane coupled to and forward of the blade outer air seal;
a second vane coupled to and aft of the blade outer air seal via a fluid sealing engagement; and
a blade outer air seal support coupled to and radially outward of the blade outer air seal, the blade outer air seal support defining at least one metering orifice and comprising a first side and a second side;
wherein:
the at least one metering orifice of the blade outer air seal support is configured to meter air flow from a first plenum to a second plenum;
the first plenum is defined by a preponderant portion of the radially outer surface of the blade outer air seal, the first side of the blade outer air seal support, and at least one of the engine case and the first vane;
the second plenum is defined by the fluid sealing engagement, the second side of the blade outer air seal support, and at least one of the engine case and the second vane; and
the first plenum is configured to maintain a desired air pressure in the event of a leak in the fluid sealing engagement between the blade outer air seal and the second vane.

* * * * *